Fig. 2
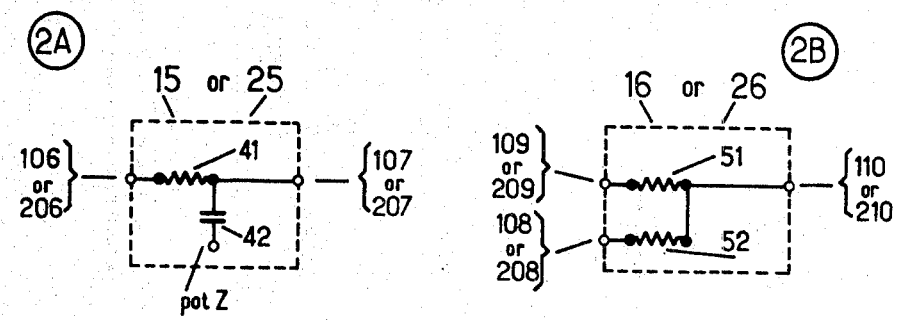
Fig 3
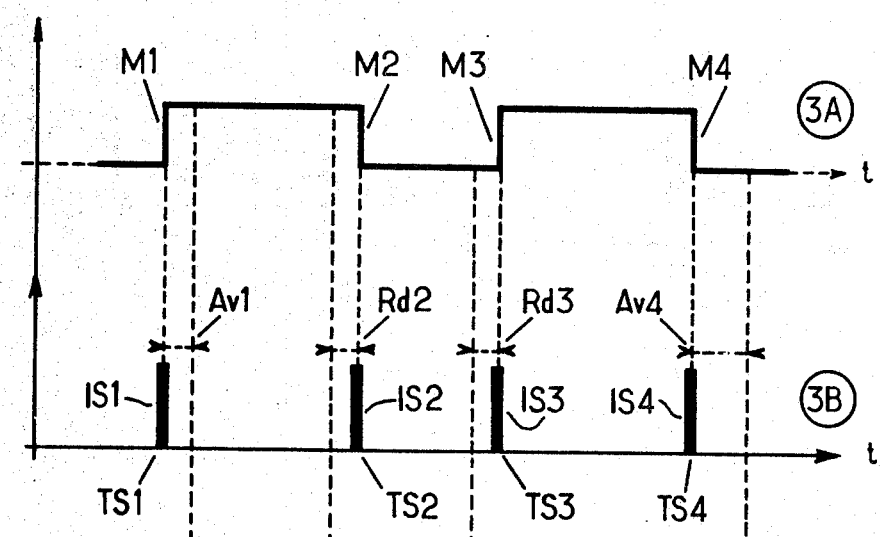
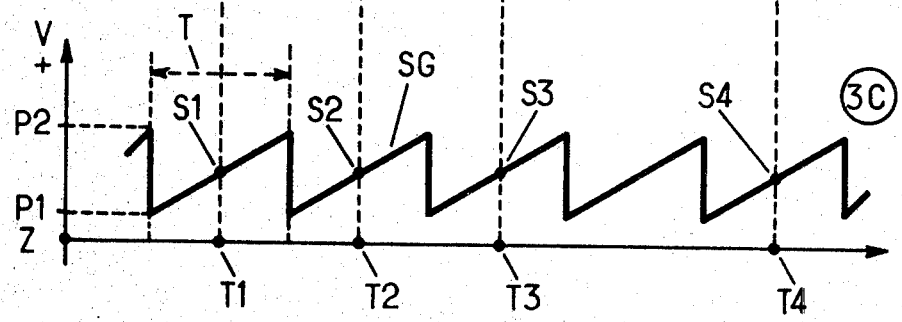

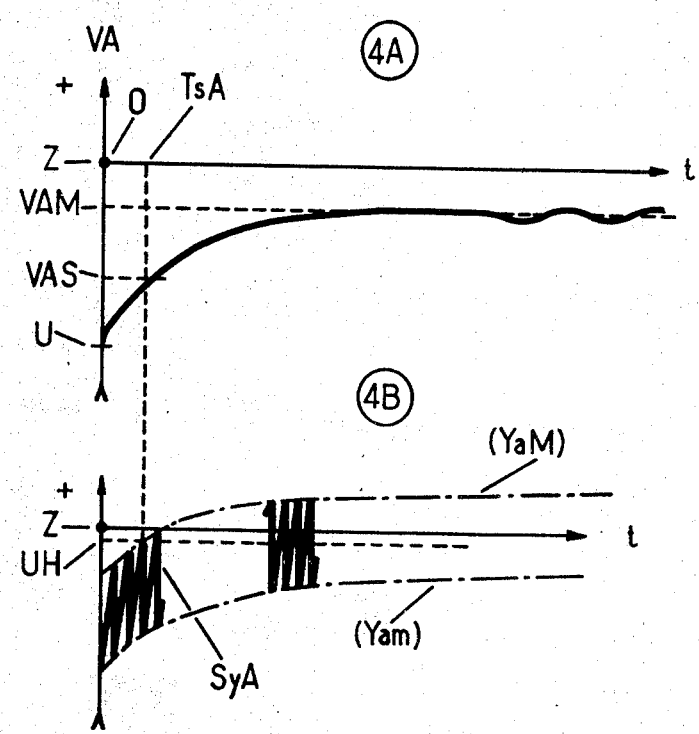
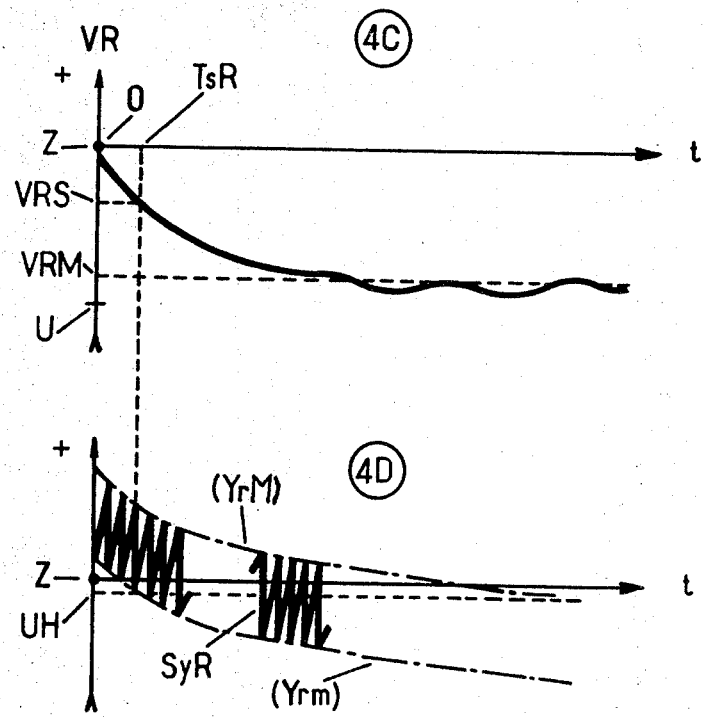
Fig. 4

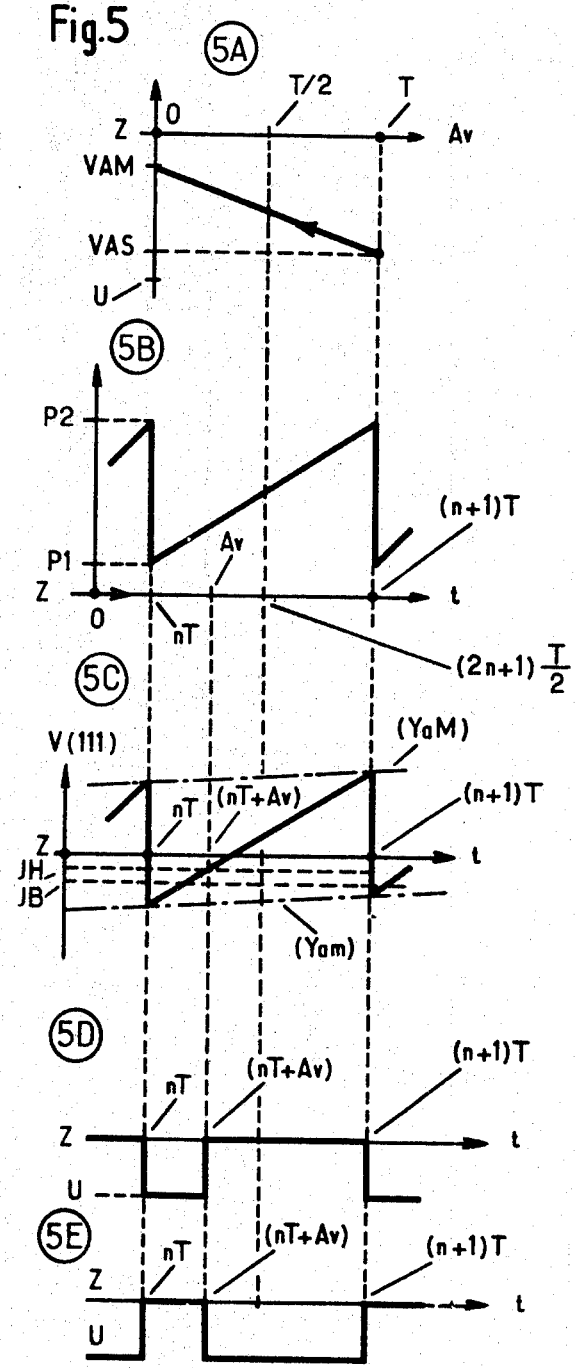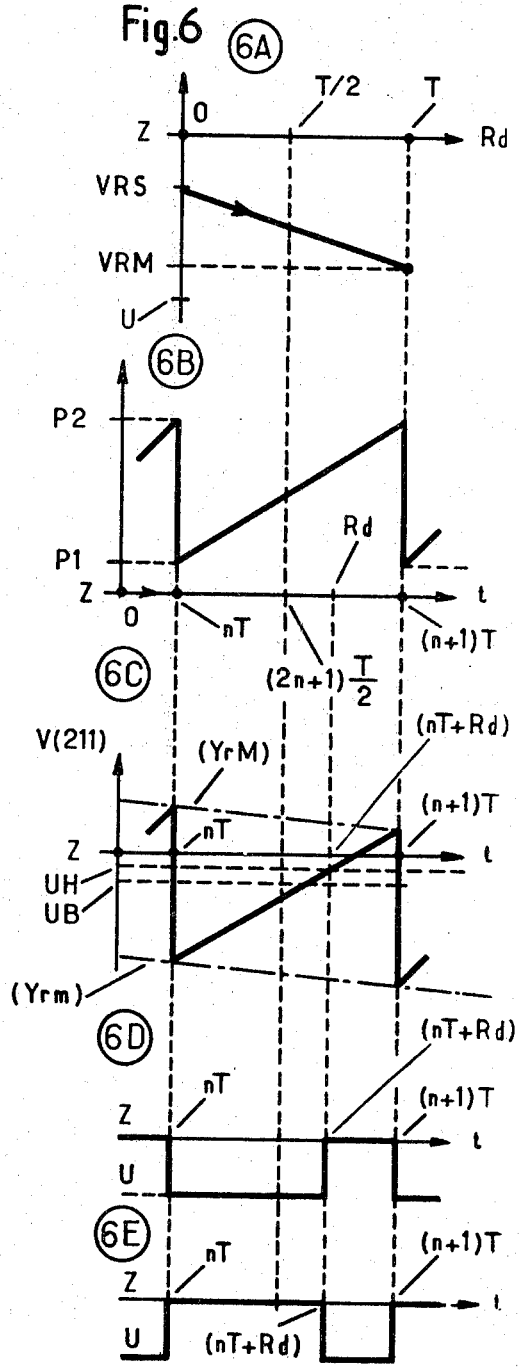

United States Patent Office 3,546,594
Patented Dec. 8, 1970

3,546,594
ANALOG DISTORTION MEASUREMENT APPARATUS FOR ISOCHRONOUS CODED TELEGRAPH AND DATA SIGNALS
Jacques Meile, Paris, France, assignor to Lignes Telegraphiques & Telephoniques, Paris, France
Filed Apr. 5, 1968, Ser. No. 719,179
Claims priority, application France, Apr. 11, 1967, 102,264
Int. Cl. H04b 1/00
U.S. Cl. 325—363                     11 Claims

ABSTRACT OF THE DISCLOSURE

A device for measuring in analog form the isochronous distortion of a bivalent modulation, comprising means for deriving from each transition of said modulation a short duration pulse, means for synchronizing a periodic reference signal by said pulses, first and second transmission channels each having an input receiving all of said pulses and an output delivering a direct-current voltage the value of which depends, for one of said channels, on the maximum lead, and for the other on the maximum lag of said transitions with respect to reference instants in said reference signal, and a circuit in which the direct-current voltages at the outputs of both said channels cause an average current of intensity proportional to said distortion to flow through an indicator apparaus.

BACKGROUND OF THE INVENTION

Field of the invention

It is well known that in a condition of perfect isochronous bivalent modulation, the transitions occur at instants referred to as "significant instants" which are spaced at "the unitary interval" (sometimes referred to as the "telegraphic period") of the modulation or at an interval corresponding to some whole number multiple of this interval, the duration of which is the reciprocal of the modulation rate expressed in bauds, for example 20 milliseconds in the case of a rate of 50 bauds.

If a condition of perfect isochronous bivalent modulation is caused to obtain at the input of a telecommunications circuit, the time taken to restore the transitions occurring in the said modulation at the receiving end of the transmission system, is not the same in the case of all transitions. The received modulation contains a telegraphic distortion which affects the significant instants of the restored modulation and is referred to as "isochronous distortion."

Each of the said significant instants suffers an "individual degree of distortion" in relation to an ideal instant of reference, and the term "degree of isochronous distortion" of a telegraphic modulation is used to indicate the algebraic difference between the largest and smallest degrees of individual distortion suffered by the significant instants during a sufficiently long, predetermined interval of time. Unlike the situation obtaining with the degree of individual distortion, the degree of isochronous distortion is independent of the choice of the ideal instant of reference. The degree of individual distortion and the degree of isochronous distortion are conventionally expressed in each case as a percentage of the unitary interval hereinbefore defined.

The individual distortion of a significant instant can be constituted by a lead or a lag in relation to the corresponding ideal instant of reference, and the degree of isochronous distortion will therefore be defined in terms of the greatest lag and the greatest lead detected during the full period of a measuring operation.

Description of the prior art

There exist numerous devices for measuring the degree of isochronous distortion, which are based upon more or less the same principles, although the actual designs of these devices differ from one to the next. For example, British Pat. 637,722 of July 24, 1946 describes a measuring device which comprises two channels in each of which a counter-circuit is triggered on appearance of the first transition in the telegraphic signal. After this time, the counter-circuit in the first channel is only re-triggered by a transition which leads its ideal (theoretical) position, and therefore only by a transition which has a lead greater than a lead already exhibited by any earlier transition; in the same way, the counter-circuit in the second channel is only re-triggered by a lagging transition, the actual lag of which is greater than the lag presented by any earlier transition. This kind of operation is obtained by designing the channels so that one of them operates exclusively during each first half-cycle of a telegraphic signal, and the other exclusively during each second half-cycle. The counter-circuit in each channel supplies the pulses used to activate a circuit which produces a rectangular waveform signal, the mean continuous component of which is proportional to the degree of distortion being measured; this degree of distortion may be indicated by a conventional measuring instrument.

The greater part of the known devices for measuring isochronous distortion are relatively large in size and weight; nevertheless, they have the advantage of allowing high precision measurement to be carried out and are well suited to use in fixed systems.

The measuring device in accordance with the present invention has a limited number of functional electronic elements, of inherently small volume, so that it is possible to design the device to have a relatively small overall volume, rendering it portable for example; a device of this kind is well suited to use in mobile equipment.

SUMMARY OF THE INVENTION

In accordance with the invention a device is provided for measuring the distortion in an isochronous bivalent modulation whose instants of transition fluctuate about reference instants spaced at whole number multiples of the unitary interval of the said modulation, the said device comprising means of triggering short-period pulses, individually corresponding to the said transitions, means of triggering a periodic sawtooth reference signal synchronised by the said pulses on a cyclic rate equal to the said unitary interval and given a phase such that the centre time of each cycle coincides substantially with one of the said reference instants, a first and a second transmission channel each with an input and an output, means for applying the said short-period pulses to each of the said inputs, means in each of said channels for producing at their respective outputs an intermittent direct voltage the mean value of which, during the period of a measuring operation, depends respectively for the one and the other the said channels, upon the maximum leads and lags in the said pulses in relation to the said reference instants, and an electrical connection linking the said outputs of the said channels and containing in series a current-indicating instrument which, as a consequence of the production of the said intermittent direct voltages, passes a current the mean value of which is a measure of the magnitude of the said distortion.

The device in accordance with the invention is characterized in that each of the said first and second channels incorporates a coincidence gate (AND-gate) each of which has applied to a first input the aforesaid short-period pulses, and to a second input an intermittent control signal, and produces at its output a "new pulse,"

or alternatively produces no pulse at all, depending upon whether or not the control signal is present or absent; a first circuit which, under the action of each of said "new pulses" produces an electrical charge of constant value; means for storing said charge in a capacitor in order to develop across the terminals thereof a continuous voltage which varies with time; a voltage adding circuit producing a new voltage equal to the sum of constant predetermined fractions of the said reference signal and the said variable continuous voltage; a second circuit which, under the action of the said new voltage produces a bivalent signal in one of its two possible states during, and only during, that portion of the said cycle within which the said new voltage exceeds a predetermined threshold level; a first means for deriving from said bivalent signal the said control signal and applying it to the said second input of the said coincidence gate; and a second means for deriving from the said bivalent signal the said intermittent direct voltage.

During the course of a measuring operation by the said device in accordance with the invention, the said variable continuous voltage varies initially, in one or other of said channels, in a fairly rapid way and in the same sense, after which it varies more slowly in the form of fairly low-amplitude fluctuations to either side of a mean value. The operation of the device is therefore such that of the short-period pulses the only ones for which the said coincidence gate is in its conductive condition, are the ones which respectively exhibit, considering the one or the other of the aforesaid channels, a lead which is greater than or substantially equal to, and a lag which is greater than or substantially equal to, the lead or lag (considered in relation to the said reference instants) presented by any preceding pulses.

Between the outputs of first and second channels, there is thus a potential difference which has a determine nonzero value exclusively during a part of each of the said cycles; this part of the cycle is substantially equal to the sum of the greatest lead and greatest lag hitherto encountered; the current-indicating instrument enables the mean value of the intermittent direct current flowing through the said electrical connection, to be measured; this mean value is thus substantially proportional to the magnitude of the modulation distortion.

The invention will be better understood from a consideration of the ensuing description and the attached drawings which illustrate non-limitative embodiments of the invention.

BRIEF DESCRIPTION OF THE DRAWINGS

FIG. 2 (in two parts 2A and 2B) schematically illustrates the design of certain of the said elements.

FIGS. 3, 4, 5 and 6, each split into several parts, illustrate sets of diagrams which are necessary for an understanding of the operation of the device of FIG. 1.

DESCRIPTION OF THE PREFERRED EMBBODIMENTS

In the following, the term "the modulation" will be employed throughout to designate the modulation upon which distortion measurement is being carried out by the device described.

The two bivalent rectangular signal states produced at determinate points in the said device will be designated by "state" and "Z state"; the said states Z and U correspond, respectively, to a reference potential Z (which at all times will be considered as zero potential), and a potential U which is lower than the said potential Z, and therefore negative.

In the following, during the period of a measuring operation, two subsidiary periods will be distinguished; in chronological order, a first subsidiary period commences at the same time as the measuring operation, namely at the instant referred to hereinafter as "the initial instant", at which the said modulation is applied to the input of the measuring device; this first subsidiary period will be termed the "transitory period" and it terminates at an instant which will be defined hereinafter; the second subsidiary period is the residual duration of the measuring operation; it will be referred to generally hereinafter as "the time elapsing after the said transitory period" or "the time elapsing after the termination of the said transitory period."

Figure 1:
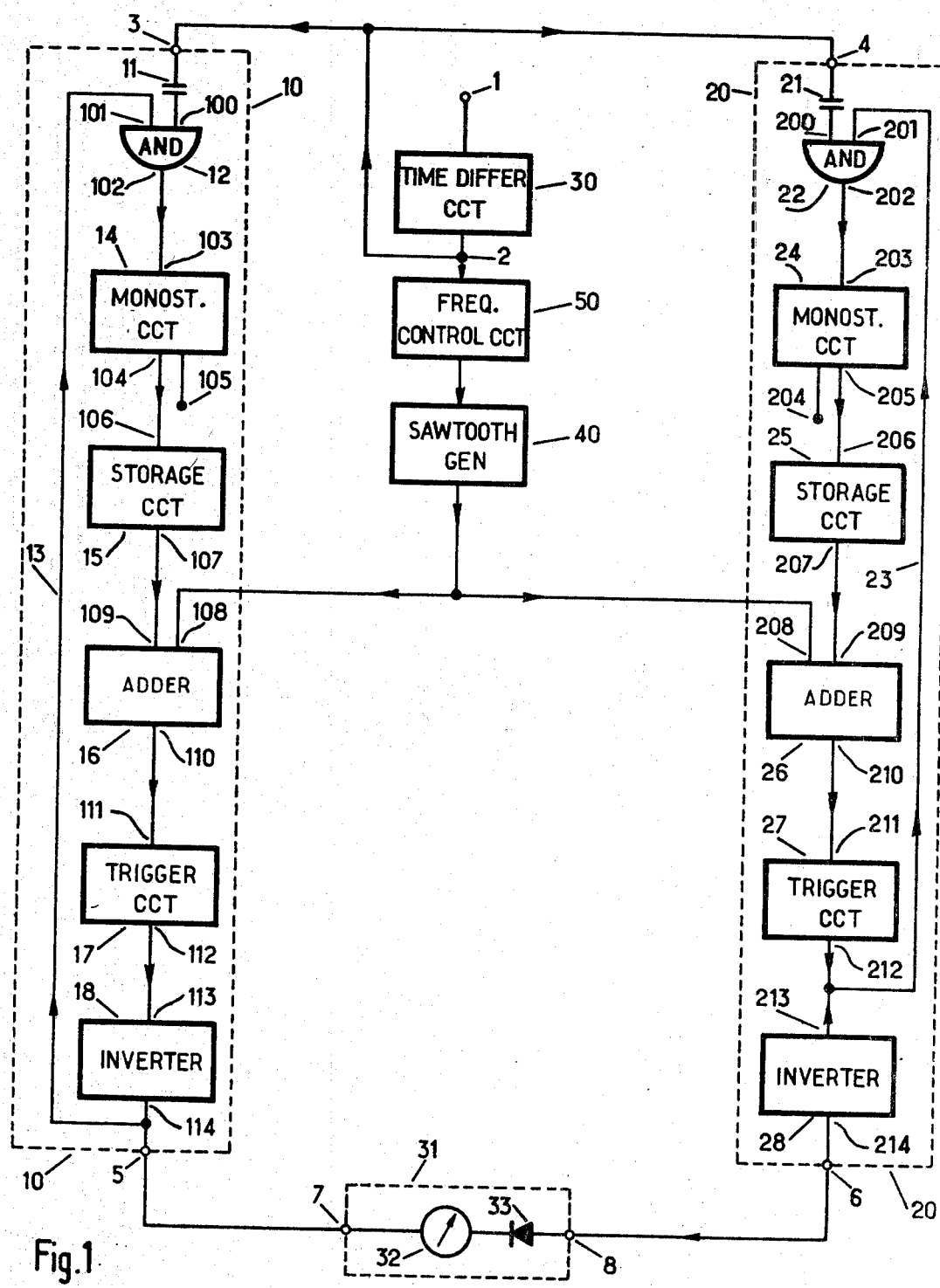
FIG. 1 illustrates the block diagram of a device in accordance with the invention, in which the elements constituting the said device are shown in the form of rectangles.

FIG. 1 schematically illustrates the arrangement of circuits and elements required to constitute a device in accordance with the present invention. The said arrangement comprises:

A circuit 30, for example a circuit which differentiates with respect to time, which derives from the transitions in the modulation applied to the input 1 of the said device, short-period positive pulses IS, which are produced by the output 2 of the said circuit 30 and constitute a concrete manifestation of the significant instants of the said transitions;

A generator 40 controlled in frequency and phase through a control device 50, by the said modulation, which produces a sawtooth signal the periodicity of which is equal to the mean unitary interval of said modulation; the said signal is shifted in phase by half a cycle in relation to the ideal significant instants of the modulation; the signal is used as a time-base and will be referred to briefly in the following as the "signal SG"; the minimum potential P1 and the maximum potential P2 of the signal SG are both greater than the potential Z; on the other hand, the decay time of the sawtooth waveform is only a small fraction of the aforesaid periodicity T (about $\frac{1}{50}$ of T) so that the instants at which the rising flanks of the sawtooth waveform are at the mean potential between P1 and P2, coincide substantially with the instants $T/2$ in each cycle of the signal SG (considered in relation to the instant of origin of the cycle), certain of said instants $T/2$ coinciding themselves with the said ideal significant intervals (see FIG. 3);

A circuit 10 referred to as the "first channel" and described in greater detail hereinafter, which is illustrated in the figure in a broken-line box and receives at its input 3 control pulses IS, and furthermore incorporates means for producing at its output 5, after a transitory period of limited duration (between 10 and 20 seconds all in accordance with the modulation rate) a bivalent rectangular signal synchronized with the signal SG; during each of its cycles, the said rectangular signal passes, after the termination of the said transitory period, from the potential U to the potential Z at the instant of origin of the cycle, then reverts from the potential Z to the potential U at another instant in the cycle, the lead of which instant in relation to the instant $T/2$ of the same cycle is substantially equal to the maximum lead in relation to the ideal position in time of those of the modulation transitions, the degree of individual leading distortion in which is among the highest during the time allotted to measurement;

A circuit 20 referred to as the "second channel" and described in greater detail hereinafter, illustrated by a broken-line rectangle in the figure, which circuit has applied to its input 4 the pulses IS and incorporates means for producing at its output 6, after the said transitory period, a bivalent rectangular signal which is synchronized with the signal SG; in each of its said cycles the said rectangular signal passes, after the termination of the said transitory period, from the potential U to the potential Z at the instant of origin of the cycle, then reverts from the potential Z to the potential U at another instant in the cycle, the delay in which instant in relation to the instant $T/2$ of the same cycle is substantially equal to the maximum delay in relation to the ideal position in time, of those of the transitions in the modulation in question, whose degree of individual delay distortion is among the highest during the time allotted for measurement;

A measuring circuit 31, the terminals 7 and 8 of which are connected respectively to outputs 5 and 6 of the channels 10 and 20, comprising a galvanometer 32 (the mechanical time constant of which is high in relation to the unitary interval of the modulation) in series with a diode 33 which passes current in the direction from 8 to 7 and blocks it in the direction from 7 to 8. The terminals referred to are at the same potential when the said outputs 5 and 6 are in the same state, either (Z, Z) or (U, U); a potential difference which is not zero and is equal in absolute value (Z−U), prevails between the terminals 7 and 8 when the outputs 5 and 6 are in different states, either (U, Z) or (Z, U).

The aforesaid means contained in each of the said channels 10 nd 20 comprise a trigger circuit designated respectively by 17 and 27, which will in particular be a system of the "Schmitt trigger" kind.

One of the operational features of a trigger of this kind is that it has different triggering thresholds; there is an upper threshold and a lower threshold, which are operative respectively for the two directions of variation in the triggering signal.

In the ensuing text, the term "trigger" will be employed to have the general meaning indicated hereinbefore.

The detailed descriptions of the channels 10 and 20 will now be given.

The said first channel 10 comprises:

An input capacitor 11 connected to the input 3 with one of its terminals;

A logic AND-circuit, marked 12, which receives from the other terminal 11, at its input 100, the positive pulses IS, and, through a control line 13, at its other input 101, the signal produced by the output 5 of channel 10; the circuit 12 passes the pulses IS to its output 102, when the said signal represents the Z state;

A monostable circuit 14 of conventional kind, through the input 103 of which there are applied the pulses IS transmitted by the circuit 12, and whose first output 104 is at the potential U when the circuit is in its stable state; the signal which appears at the second output 105 of the circuit 14 is not used in the channel 10; the monostable trigger circuit 14 produces, at the said output 104 and when one of the pulses IS transmitted by 12 is applied to its output 103, i.e., when it is in its stable state, a rectangular pulse of potential Z and duration "d"; this duration "d" should be large in relation to the unitary interval of the modulation;

A resistance/capacitor storage circuit 15, which will be referred to as the "memory" in the following, has an input 106 and an output 107 and is symbolically represented in FIG. 2A by a resistor 41 in series with a capacitor 42 that of whose electrodes opposite to the one connected at the resistor 41, is connected to a point at the potential Z; the said memory receives, at its input 106, the rectangular pulses furnished by the monostable trigger circuit 14; the time constant (RM)(CM) of the said memory is large in relation to the duration d of the said rectangular pulses, and very large in relation to the unitary interval of the modulation; at the instant (referred to hereinafter as the "initial instant") at which the modulation is applied to the input of the circuit 30, the direct potential designated by VA and produced at the output 107 of the said memory, is substantially equal to U (initial voltage across the terminals of the capacitor 42); at an instant after the measuring operation, which instant is designated by $t$, the potential VA has a value which is a function of $t$ and is referred to in the following as $f(t)$; this value depends upon the number of the said rectangular pulses which has been applied to the input 106 of the memory 15 prior to the said instant $t$; during the said transitory period, the potential VA rises gradually from the value U and in an approximately asymptotic manner, after the termination of the transitory period, it reaches a quasi-stable maximum potential lower than Z (see FIG. 4A), the mean value of which, designated VAM, is the nearer the potential Z the higher the degree of individual leading distortion presented by the transitions in the modulation;

A voltage-divider 16 (illustrated in FIG. 2B by the resistors 51 and 52 connected in series) across the inputs 108 and 109 of which there are respectively applied the signal SG and the rising potential VA equal to $f(t)$, is provided; the said voltage-divider produces at its output 110 a new sawtooth signal (result of the addition of fixed fractions of the variable direct voltage VA, and the signal SG), which is synchronous with the signal SG and in this case is designated as signal SyA; the maximum and minimum values of the said signal SyA, which values are respectively termed YaM and Yam, are defined by the expressions set out hereinafter in which the constant $k$ is equivalent to the division ratio of the voltage-divider 16, i.e.

$$k = R52/(R51+R52)$$

(1)   $YaM = kVA + P2(1-k) = kf(t) + P2(1-k)$ (2)   $Yam = kVA + P1(1-k) = kf(t) + P1(1-k)$

YaM and Yam are intersecting functions of $t$ which, but for the constant factor $k$, follow the variations in $f(t)$; the signal SyA and its envelope curves (YaM) and (Yam), are illustrated in the diagram 4B of FIG. 4;

A trigger circuit 17 to the input 111 of which the signal AyA produced by the voltage-divider 16 is applied and whose output 112 is at the potential U when the maximum voltage YaM of the said signal is below the top triggering threshold, designated by "UH", of the said trigger circuit; commencing from a certain instant in the transitory period, said instant being designated by TsA (see FIGS. 4A, 4B, 5A and 5E) for which the said maximum voltage YaM is substantially equivalent to the said triggering threshold UH, the trigger circuit 17 produces at its output 112 a bivalent rectangular waveform signal, synchronised with SG, which, in each of its cycles, passes from the potential U to the potential Z at an instant in the cycle designated by "Av", at which instant the instantaneous value of the said signal SyA reaches, during the rise time of the sawtooth waveform, the top triggering threshold UH, then reverts from the potential Z to the potential U when the instantaneous voltage of the said signal drops, during the decay time of the sawtooth waveform, beneath the lower triggering threshold, designated by "UB" of the trigger 16, that is to say, at the instant T in the cycle considered; considering the said instant TsA, the instant Av in each cycle at which the "top" triggering of the circuit TA takes place, is the nearer the instant of origin of the given cycle the higher the potential VA, or $f(t)$; the interval between the said instant Av and the instant of origin is given by the following linear function of VA (3)   $$Av = T - \frac{1}{m} \times \frac{1-k}{k} [VA - VAS]$$

in which VAS is the value of $f(t)$ at the instant TsA, $k$ is the voltage division ratio already defined, and $m$ the slope of the rising part of the sawtooth waveform of signal SG, i.e.

$$\frac{P2-P_1}{T}$$

An electronic inverter 18, whose input 113 is connected to the output 112 of the trigger 16, whilst its output 114 goes to the output terminal 5 of channel 10;

A direct control line 13 constituted by a conductor connected on the one hand to the output 114 of the inverter 18, and on the other hand to the input 101 of the circuit 12; this circuit either passes or inhibits the pulses IS to the monostable trigger circuit 14, depending upon whether the output 114 of the said inverter is in the Z state or the U state.

The said second channel 20 differs from the said first channel 10, in terms of the features listed hereinafter:

The control line 23 which controls the operation of the logic circuit 22, links the output 212 of the trigger 27 to the input 201 of the circuit 22 and this circuit either passes or inhibits the pulses IS to the monostable trigger circuit 24, depending upon whether the output of the trigger circuit 27 is in the Z state or the U state, i.e. depending on whether the output 214 of the inverter 28 is in the U state or in the Z state, this being the inverse of what happens in channel 10;

The output used for the monostable trigger circuit 24 is the output 205, this instead of the output 204 which is the corresponding one to the output 104 used in the monostable trigger circuit 14, so that when the monostable trigger circuit 24 is in its stable condition, the output 205 is at the potential Z and the said trigger circuit produces at its output rectangular waveform pulses of potential U and fixed duration $d$, when a pulse IS is applied to its input 203;

The potential VR at the output 207 of the memory 25 is, like VA, a time-based function designated by $g(t)$ in the following; the said potential VR decays gradually from the level Z, this being the initial voltage across the terminals of the capacitor 42 of the memory 25, and in an approximately asymptotic manner it reaches, after the termination of the said transitory period, a quasi-stable minimum negative potential (see FIG. 4C), the mean value VRM of which is the nearer U the higher the degree of individual delay distortion presented by the transitions in the modulation;

The signal produced at the output 210 of the voltage-divider 26 is a sawtooth modulated signal, synchronous with the signal SG and designated by SyR, the maximum and minimum ordinate values YrM and Yrm, of which, are defined respectively by the expressions (4) and (5) hereinafter quoted:

(4)   $YrM = k\ g(t) + P_2(1-k)$ (5)   $Yrm = k\ g(t) + P_1(1-k)$ the said functions, but for the factor $k$, follow the variations in the decaying potential VR which is equal to $g(t)$; the signal SyR and the envelope curves corresponding to it (YrM) and (Yrm), are illustrated in the diagram 4D of FIG 4;

The output 212 of the trigger 27 is at the potential Z as long as the minimum voltage Yrm of the signal SyR applied to the input 211 of the said trigger is greater than its top triggering threshold UH; commencing from a certain instant in the transitory period, which instant is designated by TsR (see FIGS. 4C, 4D, 6A to 6E), for which the said minimum voltage Yrm is substantially equal to the said triggering threshold of UH, the trigger 27 produces at the said output 212 a bivalent rectangular waveform signal, synchronous with SG, which in each of its cycles passes from the potential U to the potential Z at an instant in the cycle designated by "R$d$" for which the instantaneous value of the signal SyR reaches, during the rising portion of the sawtooth waveform, the said triggering threshold UH, and then reverts from the potential Z to the potential U when the sawtooth waveform starts to decay, that is to say virtually at the instant T in the cycle considered; considering the said instant TsR, the instant "R$d$" in each cycle, at which the "top" triggering of the trigger takes place, is the nearer the instant T in the same cycle the lower is the potential VR, or $g(t)$, and the interval between the said instant R$d$ and the instant of origin of the cycle is given by the following linear function of VR:

(9) $$Rd = \frac{1}{m} \times \frac{1-k}{k} [VRS - VR]$$

VRS being the value of the potential VR, equal to $g(t)$, at the instant TsR, and $m$ and $k$ being the constants already defined hereinbefore.

In FIG. 3, the diagrams 3A, 3B, 3C respectively indicate, on a time-base:

Part of the modulation, comprising the transitions M1, M2, M3, . . . ;

The control pulses IS1, IS2, IS3, . . . produced by the said circuit 30 and arriving at the significant instants TS1, TS2, TS3, . . . of the said transitions;

The signal SG, the minimum and maximum potentials P1 and P2 of which are plotted on the ordinates; the points S1, S2, S3, . . . which are the mid-points of the rising parts of the waveform of the said signal, correspond respectively to the ideal significant instants T1, T2, T3, . . . plotted on the abscissae, these being the instants at which the said pulses IS1, IS2, IS3, . . . ought to appear.

In the said FIG. 3, the intervals of time A$v$1, R$d$2, R$d$3, . . . which are respectively equivalent to the absolute values of the differences $(TS1-T1)$, $(TS2-T2)$, $(TS3-T3)$, . . . respectively represent the leads or lags in the transitions M1, M2, M3, . . . is in relation to their ideal positions in time.

In FIG. 4, the diagram 4A represents the variations in the potential VA or $f(t)$; in the said diagram, the ordinates plot the reference potential Z, the negative potential U to which the potential VA is substantially equal at the initial instant (marked 0 on the abscissae), the potential VSA equal to $f(TsA)$, and the potential VAM about which the potential V fluctuates after the termination of the transitory period; it will be noted that the curve has a substantially horizontal asymptote of ordinate value VAM, which is marked in broken-line.

The diagram 4B has the form corresponding to the time-based variation in the signal SyA applied to the input 111 of the trigger circuit 17; the curves marked (YaM) and (Yam), which are marked in chain-dotted lines, respectively illustrate the envelopes of the maximum and minimum ordinate values of the said signal; in the said diagram, there are marked on the ordinates, the triggering threshold UH of the trigger 17 and on the abscissae, the instant TsA at which the maximum voltage YaM of signal SyA reaches the said triggering threshold.

The diagram 4C illustrates the variation in the potential VR, or $g(t)$; in this diagram, there are plotted on the ordinate the above-mentioned potentials Z and U, the potential VRS which is equal to $g(TsR)$, and the potential VRM about which the potential VR fluctuates after the termination of the transitory period, the curve VR having a horizontal asymptote of ordinate value VRM, which has been marked in broken-line.

The diagram 4D has a form corresponding to the time-based variation of the signal SyR applied to the input 211 of the trigger 27; the curves marked (YrM) and (Yrm), which are shown in chain-dotted line, respectively illustrate the envelopes of the maximum and minimum ordinate values of the signal SyR; in the said diagram, there are marked on the ordinates the triggering threshold UH of the trigger, and on the abscissae, the instant TsR at which the minimum voltage of the signal SyR is equal to the said triggering threshold.

The diagram 5A of FIG. 5 illustrates the linear characteristic of the instant A$v$ of a cycle in the signal SG, which is defined by the expression (3) in each cycle, as a function of VA; this expression is valid after the instant TsA in the transitory period. The quantity VA is plotted on the ordinates and the values of AV between O and T are plotted on the abscissae; the arrow marked on the said linear characteristic indicates the direction in which it is described by points representative of successive cycles, commencing from the instant T$s$A and working up to the end of the transitory period.

The diagram 5B illustrates a cycle of the said reference signal SG, between two instants $n$T and $(n+1)$ T, which are part of the final fraction of the transitory period in which the trigger TA triggers, this happening in each cycle at an instant A$v$ prior to the instant $T/2$ in the cycle.

The digram 5C represents the corresponding cycle of the signal S$y$A; in this diagram, the portions of the envelopes (Y$a$M) and (Y$am$) of the said cycle of the said signal have been shown, as also have the "top" and "bottom" triggering thresholds UH and UB respectively of the trigger 17, and the instant $(nT+Av)$ at which the instantaneous potential of the signal S$y$A is equal, during the rising portion of the sawtooth waveform, to the triggering threshold UH.

The diagram 5D illustrates the corresponding cycle of the bivalent rectangular waveform signal produced at the output 112 of the trigger 17; the said signal passes from the potential U to the potential Z at the above-mentioned instant $(nT+Av)$ and returns to the potential U at the instant at which the instantaneous potential of the signal S$y$A is equal, during the decay time of the sawtooth waveform, to the "bottom" triggering threshold UB, that is to say, virtually at the instant $(n+1)$ T.

The diagram 5E represents the corresponding cycle of the bivalent rectangular waveform signal, inverted in relation to the preceding signal, and produced at the output 114 of th inverter 18.

FIG. 6 lists the diagrams 6A, 6B, 6C, 6D and 6E, relating to the circuit CRD, which correspond respectively to the diagrams 5A, 5B, 5C, 5D and 5E of FIG. 5; all the notations employed have been defined hereinbefore; the instant R$d$ is later than the instant $T/2$ of the cycle.

In the following, the operation of the measuring device of FIG. 1 will be described from the above-mentioned initial instant at which the modulation is applied to the input 1, up to the end of the transitory period and then through its time of stable operation, no measurement being valid until this stable state has been established.

The operation of the channel 10 will be explained later; at this point we shall deal with channel 20.

Prior to the said initial instant, the monostable trigger circuit 14 is in its stable state; the output 104 is at the potential U, likewise the output 107 of the memory 15 and, in accordance with the foregoing expression (1), the maximum potential of the signal S$y$A has a constant value PA substantially equal to $kU+P2(1-k)$.

The values of the maximum potential P2 in the signal SG and the resistances of the resistors 51 and 52 in the voltage-divider 16, are determined in such a way that the potential PA is below the triggering threshold UH of the trigger 17. The output 112 of the trigger is at the potential U and the output 114 of theinverter 18 at the potential Z, so that the circuit 12 is conductive for positive pulses applied to its input 100.

It follows from this that when the modulation is applied, at the aforesaid initial instant, to the input 1 of the device, all the pulses IS produced by the latter are transmitted by the circuit 12 to the monostable trigger circuit 14, and cause the latter to produce rectangular waveform pulses of potential Z and duration $d$, which have a high train frequency; the mean potential applied to the input of the U and the output 114 of the inverter 18 at the potential Z, the capacitor 42 of the said memory commences to discharge in accordance with the function imposed by the magnitudes of the components 41 and 42 of the said memory; the potential VA, or $f(t)$, rises and approaches the potential Z, as do the maximum and minimum potentials Y$a$M and Y$am$ of the signal S$y$A.

At the instant T$s$A hereinbefore defined, which is later by some seconds than the initial instant, and then passes, the triggering threshold UH of the trigger 17; the latter then, after the said instant T$s$A, transforms the signal S$y$A into a bivalent rectangular waveform signal synchronous with the signal SG, which passes, at the instant A$v$ in each cycle, defined by the aforementioned relationship (3), from the potential U to the potential Z and then reverts to the potential U at the instant T in each cycle; the output signal from the inverter 18, which is inverted in relation to the aforementioned signal, is at the potential Z between the instant of origin and the instant A$v$, in each cycle, and passes to the potential U at the said instant A$v$, remaining at that level until the completion of the cycle; the said output signal from the inverter 18, connected through the line 13 to the input 101 of the circuit 12 thus, between the instants A$v$ and T in each cycle, blocks transmission of the pulses IS to the input of the monostable trigger circuit 14; thus, the said trigger circuit only receives those pulses IS which, in the cycle in which they appear, lead the instant A$v$ at which the "top" triggering of the trigger circuit 17 takes place.

As FIG. 5 indicates (diagrams 5A and 5C), when the maximum potential Y$a$M of the signal S$y$A is slightly higher than the triggering threshold UH of the trigger circuit 17, the said triggering takes place at an instant A$v$ in the cycle which precedes by a very short time the instant T in the said cycle; then, as the potential VA rises, the said triggering takes place sooner and sooner in successive cycles, so that, parallel with this, the time for which the circuit 12 allows the pulses IS to pass in each successive cycle, progressively decreases. After the time at which triggering starts to take place at the instant $T/2$ in the cycle $(Av=T/2)$, the circuit 12 ceases to pass to the monostable circuit 14 those pulses IS which lead their ideal position in time.

The closer the "top" triggering of the trigger circuit approaches to the time $T/2$ in the cycle, the greater the number of pulses IS which are passed by the circuit 12 and the rectangular waveform pulses produced by the monostable trigger circuit 14 appear at a sufficiently high train frequency to bring the mean voltage applied to the input 106 of the memory 15 to a level above the voltage across the terminals of the capacitor 42 of the said memory; the said capacitor continues to discharge at a slower rate than at the commencement of the transitory period; the voltage VA across its terminals continues to rise, and the time for which the circuit 12 is conductive, during each cycle, for the pulses IS, continues to reduce. The pulses IS which actually succeed in getting across the circuit 12 fall off in number, and the time arrives where the interval between the rectangular waveform pulses produced by the monostable trigger circuit 14 becomes such that the mean voltage applied to the input of the memory 15 is substantially equal to the voltage VA, or $f(t)$, across the terminals of the capacitor 42 of the said memory.

This moment marks the end of the transistory period.

Thus, each pulse IS which is able to pass the circuit 12 and result in the production of a rectangular waveform pulse by the monostable trigger circuit 14, is followed by a slight increase in the potential VA and by a slight contraction of the time for which the said circuit 12 is conductive for the said pulses IS, the result is a reduction in the probability that another of the said pulses will be passed. Before any such other pulse appears, the potential VA decays slightly and this is translated into a slight increase in the time for which the circuit 12 passes the pulses IS, and this means an increased probability that a new pulse will be passed which, when it does appear, causes the potential VA, or $f(t)$, to rise again. The said potential fluctuates about a mean value VAM (see FIG. 4, diagrams 4A and 4B), which is the closer to Z, the higher is the degree of individual leading distortion presented by the transitions in the modulation.

Parallel with this, when the potential VA is virtually stabilised about the value VAM, the "top" triggering of the trigger circuit 17 takes place at an instant in each cycle, whose interval $Av$ in relation to the instant of origin of the cycle, fluctuates about a mean minimum value defined, in accordance with the aforementioned expression (3) by (7) $$Avm = T - \frac{1}{m} \times \frac{1-k}{k} \times [VAM - VAS]$$

Thus, after the termination of the above-mentioned transitory period, there is established in channel 10 a quasi-stable state in which the pulses IS which are able to pass the circuit 12 are those which coincide, in that cycle of the signal SG in which the appear, with the instant $Av$ at which the output signal from channel 10 passes from the potential Z to the potential U, or which lead this instant; the said instant $Av$ thus coincides substantially with the instant $Avm$ hereinbefore defined, the lead of which in relation to the instant $T/2$ in the cycle, is given by $$\left[\frac{T}{2} - Avm\right]$$

the maximum degree of individual leading distortion, presented by the transitions in the modulation being examined, is thus substantially equal to (8) $$\frac{1}{T} \times \left[\frac{T}{2} = Avm\right]$$

We will now describe the operation of channel 20, which is similar to that of channel 10.

After the termination of the transitory period, when the potential VR, or $g(t)$, has virtually stabilised about the mean minimum value VRM hereinbefore defined, the "top" triggering of the trigger stage TR takes place at an instant in each cycle, the interval $Rd$ of which in relation to the instant of origin of the cycle, fluctuates about a mean maximum value defined, in accordance with the above expression (6), by (9) $$RdM = (VRS - VRM)\left(\frac{1}{m}\right)\left(\frac{1-k}{k}\right)$$

Thus, in channel 20 and after the termination of the transitory period, a quasi-stable state establishes itself in which the pulses IS which are able to pass the logic circuit 22 are those which coincide, in the particular cycle of signal SG in which they occur, with the instant $Rd$ at which the output of the channel 20 passes from the potential Z to the potential U, or which are delayed in relation to this instant; the said instant $Rd$ thus substantially coincides with the instant $RdM$ hereinbefore defined, the delay of which in relation to the instant $T/2$ of the cycle is equal to $$\left(RdM - \frac{T}{2}\right)$$

the maximum degree of individual delay distortion presented by the transitions in the modulation being examined, is thus substantially equal to the ratio:

(10) $$\frac{1}{T}\left[RdM - \frac{T}{2}\right]$$

Commencing from the instant in the transitory period at which the trigger 17 commences to change state, before the trigger 27, the outputs 5, 6 of channels 10 and 20 are at the same potential within each cycle, between the instant of origin and the instant $Av$, as well as between the instant $Rd$ and the instant T (potential Z and potential U respectively); between the instants $Av$ and $Rd$ in the cycle, the potential at 5 is U and that at 6 is Z; the galvanometer AM passes a constant current (the value of which depends upon the resistance R of the galvanometer) between the times $Av$ and $Rd$; during the two other fractions of the cycle (before $Av$ and after $Rd$) no current flows across the galvanometer.

The galvanometer has quite a high time constant in relation to the unitary interval, in order that the needle deflection shall be proportional to the mean current during the cycle; the value of this mean current $Ig$ is given by

(14) $$Ig = \frac{U}{R}\left[\frac{Rd - Av}{T}\right]$$

After the termination of the said transitory period, the variable direct voltages VA and VR fluctuate slowly to either side of their respective mean maximum values VAM and VRM, whilst the instants $Av$, $Rd$ fluctuate to either side of the instants $Avm$, $RdM$, defined by the expressions (7) and (9).

The mean current per cycle, $Ig$, itself fluctuates about a mean value $RdM$, which is given by the expression:

(15) $$IgM = \frac{U}{R}\left[\frac{RdM - Avm}{T}\right]$$

and this can be written as:

(16) $$Igm = \frac{U}{R}\left[\frac{Rdm - \frac{T}{2}}{T} + \frac{\frac{T}{2} - Avm}{T}\right]$$

Bearing in mind the expressions (8) and (10), derived hereinbefore, the expression (16) states that the mean maximum current $IgM$ is proportional to the quantity substantially equal to the degree of isochronous distortion present in the modulation during the time of measurement.

In practice, at the end of a short time after the termination of the said transitory period, the needle of the galvanometer will be seen to oscillate slowly about a mean maximum position, which corresponds substantially to the mean maximum current $IgM$.

The graduation of the galvanometer is effected in such a way that reading off the needle deflection directly gives the value of the degree of distortion measured, as a percentage of the unitary interval.

The needle oscillates slowly and therefore the reading can either be taken as a mean position, or as the maximum deflection; in the latter case, the reading is higher than the true one, but where the measurement of a quantity such as distortion is concerned, this is admissible. However, experience shows that the actual error is small anyway; in terms of percentage, it does not exceed 1 to 2% for a distortion in the order of 40%, and 0.5 to 1% for a distortion in the order of 10%.

The precision of measurement is the better the smaller is the amplitude of the needle deflection. This amplitude, like those of VA and VR to either side of VAM and VRM respectively, depends upon the relative values of the duration $d$ (the pulses produced by 14 and 24), the time constant of each of the memories 15 and 25, and the mean unitary interval of the isochronous bivalent modulation upon which distortion measurement is being carried out.

The amplitude of the deflections is the smaller, the higher is the ratio between the said time constant and the mean unitary interval.

In practice, in order to be able to carry out sufficiently accurate measurement on a 50 bauds (standardised minimum rate) modulation rate, i.e. giving a unitary interval of 20 milliseconds, a time constant in the order of around 2 seconds will be employed, meaning a ratio in the order of 100; the duration $d$ corresponding to this, will be in the order of 0.2 second.

Considering the same characteristics, the precision of measurement will be all the better for modulation rates greater than 50 bauds.

In one and the same apparatus, it is possible to provide means associated with a generator 30 which produces a series of basic frequencies corresponding to different standardised modulation rates, for example 50, 75, 100, . . . 3000 bauds, etc.

One of the advantages of the measuring device in accordance with the present invention, resides in the fact that the degree of isochronous distortion measured is proportional to the interval of time de-limited, in each cycle of the reference signal, by the two instants $Av$ and $Rd$, and that these two instants are situated at either side of the centre of each cycle, which is taken as the reference instant; the measurement of this interval cannot be falsified by any phase slip between the modulation and the reference signal SG; this advantage becomes particularly significant where the apparatus is being used in conjunction with different modulating rates.

In the following, we will discuss a variant form of the device in accordance with FIG. 1, which generally constitutes a preferred embodiment.

Figure 7:
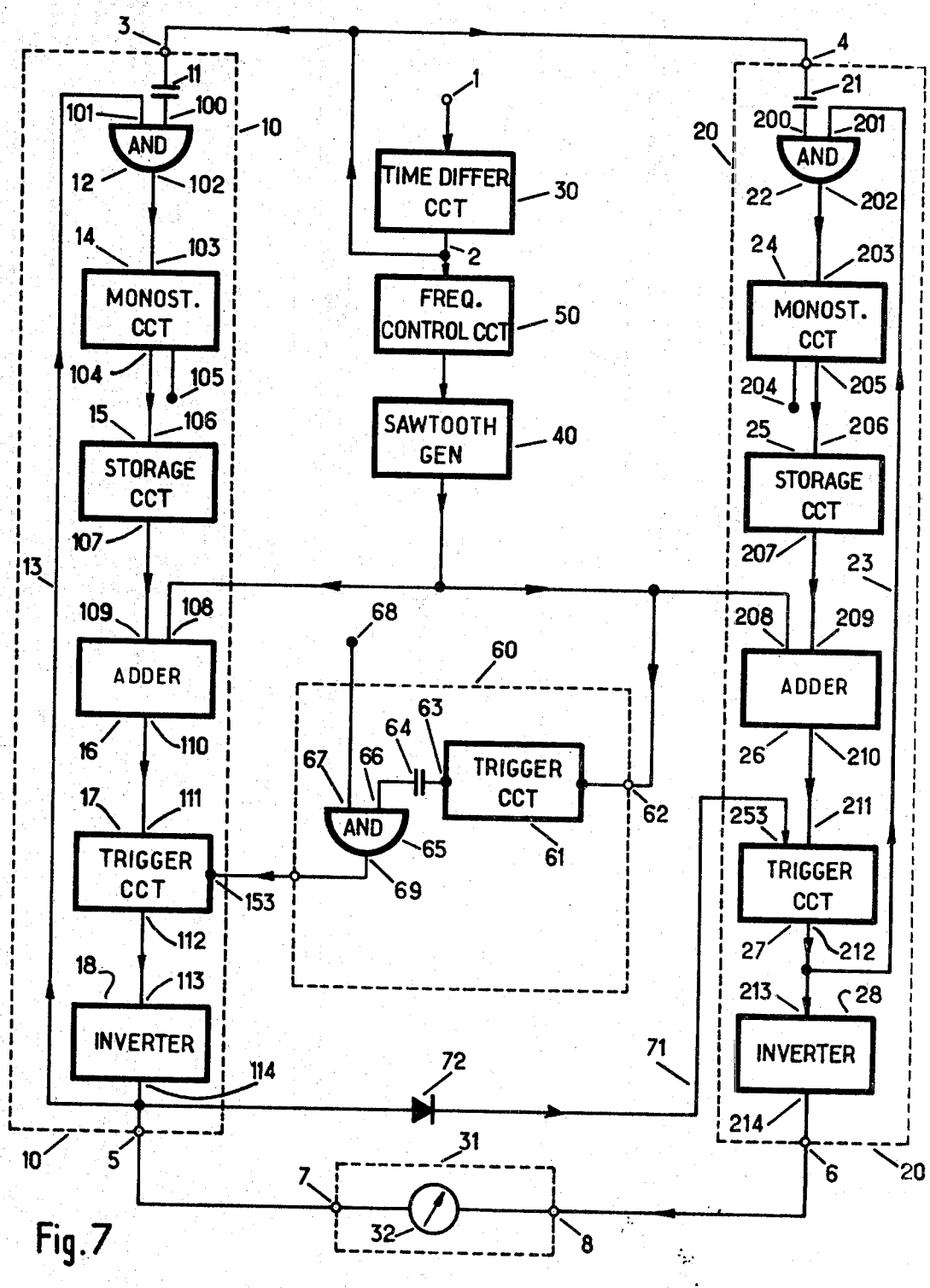
FIG. 7 illustrates a variant embodiment of the device of FIG. 1.

FIG. 7 illustrates the block diagram of the said variant embodiment; this differs from the device of FIG. 1, in terms of the following features.

A control link 71 containing a diode 72, connects the output 114 of the inverter 18 with the collector of the input transistor of the trigger 27, via the terminal 253; this link feeds to the said collector a potential Z which delays the "top" triggering of the trigger circuit 27 as long as, in each cycle, the output signal from the channel 10 is at the potential Z, that is to say, as long as the trigger 17 has not itself changed state; the consequence is that during that fraction of the transitory period in which the trigger 17 changes state, this at an instant in each cycle later than the instant $T/2$, the output signals from channels 10 and 20 are maintained at the same potential during the whole of the cycle, and that the galvanometer 32 indicates no deflection.

As soon as the trigger 17 changes state, this at an instant in the cycle which is earlier than the instant $T/2$, the trigger 27 changes state freely at the instant $Rd$ in each cycle, said instant being defined by the aforementioned expression (6); the said instant is later than the instant $Av$ at which the trigger 17 changes state; the operation of the device shown in FIG. 7, is thus similar to that of the device of FIG. 1.

The device of FIG. 7 is also distinguished from that of FIG. 1, by virtue of the fact that it incorporates a zeroing circuit, marked 60 and defined by a broken-line box; the said circuit is designed to ensure that the trigger circuit 17 undergoes "bottom" triggering at the instant that the sawtooth waveform of signal $SyA$ starts to decay. A circuit of this kind is necessary in circumstances where, for high degrees of isochronous distortion (in the order of 30 to 50% for example), the minimum potential $Yam$ of the signal $SyA$ applied to the input of the trigger circuit 17, runs the risk of being higher than the bottom triggering threshold UB of the said circuit.

The circuit 60 is constituted and operates, in the following manner:

a trigger circuit 61 produces from the signal SG applied to its input 62 a bivalent rectangular waveform signal synchronised with the signal SG; the said rectangular waveform signal, produced at the output 63, passes from the negative potential U to the reference potential Z at the instant at which the sawtooth waveform of the signal SG starts to decay;

a capacitor 64 derives from the said rectangular waveform signal a positive pulse which appears at the instant that the sawtooth waveform starts to decay;

an AND-type logic circuit, marked 65, is supplied at its input 66 with the said positive pulses; its other input 67 is connected at 68 to a point which is at potential Z; the said logic circuit passes to the trigger 17 the said positive pulses which, applied to the base of the output transistor of the said trigger (via terminal 153) at the instant at which the sawtooth waveform of the signal starts to decay, bring about the "bottom" triggering of the said trigger circuit.

What is claimed is:

1. A device for the measurement if the isochronous distortion of a bivalent modulation the transition instants of which fluctuate about reference instants spaced by a constant unit time interval, comprising:
   means for deriving from each of said transitions a corresponding short duration pulse;
   means for generating a periodic reference sawtooth signal having a recurrence cycle equal to said unit interval and such a phase that the middle of each cycle thereof substantially coincides with one of said reference instants;
   a first and a second measurement channel each having an input to which said pulses are applied and the respective outputs of which deliver direct-current voltages respectively depending on the maximum lead and maximum lag of said transitions with respect to said reference instants;
   and means for causing both of said direct-current voltages to operate a common direct-current indicating apparatus;
   said device further comprising in each of said channels;
   a gate having an output and a first and a second input to which are respectively applied said pulses and a control signal;
   first means controlled by output pulses from said gate for delivering for each of said output pulses an electric charge having a given constant value;
   storing means successively receiving from said first means all of said electric charges and storing them in the form of a time-varying direct-current voltage;
   a voltage adder circuit receiving said reference signal and time-varying voltage and delivering a new voltage equal to the sum of respective constant fractions of said reference signal and time-varying voltage;
   second means receiving said new voltage and delivering said control signal in the form of a rectangular wave having a given constant amplitude during the portion of each cycle of said reference signal during which the value of said sum exceeds a predetermined level and an amplitude different from latter said amplitude outside said portion;
   connection means for applying said control signal to said second input of said gate;
   and third means controlled by said control signal for causing a current supplied by a direct-voltage source to flow through said indicating apparatus.

2. A device as claimed in claim 1, in which said gate is an "AND" logic circuit.

3. A device as claimed in claim 1, in which said first means is a monostable circuit.

4. A device as claimed in claim 1, in which said storing means consists of the assembly of a capacitor and a fixed resistor.

5. A device as claimed in claim 1, in which said second means is a trigger circuit.

6. A device as claimed in claim 1, in which said constant fractions are obtained from voltage dividers.

7. A device as claimed in claim 1, in which said connection means consists for one of said channels of a polarity inverter and for the other of said channels of a direct connection.

8. A device as claimed in claim 1, in which said third means includes a polarity inverter.

9. A device as claimed in claim 1, including a supplementary circuit controlled by said reference signal and delivering to said second means in one of said channels an extra control signal when said predetermined level is not passed through in the decreasing direction by said sum of constant fractions of said reference signal and time-varying voltage.

10. A device as claimed in claim 1, in which said supplementary circuit includes a trigger circuit.

11. A device as claimed in claim 1, including a supplementary connection including a diode connecting said third means in one of said channels to said second means in the other of said channels, whereby latter said second means is blocked during a fraction of the cycle of said reference signal controlled by said second means in said one of said channels.

No references cited.

ROBERT L. GRIFFIN, Primary Examiner

A. J. MAYER, Assistant Examiner

U.S. Cl. X.R.

324—68